US009154622B2

(12) United States Patent
Li et al.

(10) Patent No.: US 9,154,622 B2
(45) Date of Patent: *Oct. 6, 2015

(54) VISUAL INTERACTIVE VOICE RESPONSE

(71) Applicant: AT&T INTELLECTUAL PROPERTY I, L.P., Atlanta, GA (US)

(72) Inventors: Kevin Ansia Li, Chatham, NJ (US); Alicia Abella, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,155

(22) Filed: Apr. 1, 2015

(65) Prior Publication Data
US 2015/0207933 A1 Jul. 23, 2015

Related U.S. Application Data

(63) Continuation of application No. 12/961,620, filed on Dec. 7, 2010, now Pat. No. 9,025,737.

(51) Int. Cl.
H04M 1/64 (2006.01)
H04M 3/493 (2006.01)

(52) U.S. Cl.
CPC .................................... *H04M 3/493* (2013.01)

(58) Field of Classification Search
CPC combination set(s) only.
See application file for complete search history.

(56) References Cited

U.S. PATENT DOCUMENTS

| 5,802,526 | A | 9/1998 | Fawcett et al. |
| 6,920,425 | B1 | 7/2005 | Will et al. |
| 7,054,939 | B2 | 5/2006 | Koch et al. |
| 7,908,381 | B2 | 3/2011 | Koch et al. |
| 8,000,454 | B1 | 8/2011 | Or-Bach et al. |
| 8,086,253 | B1 * | 12/2011 | Kalamkar et al. ............ 455/466 |
| 8,775,635 | B2 | 7/2014 | Koch et al. |
| 9,025,737 | B2 | 5/2015 | Li et al. |
| 2006/0194572 | A1 | 8/2006 | Fresonke et al. |
| 2007/0135101 | A1 | 6/2007 | Ramati et al. |
| 2009/0028308 | A1 * | 1/2009 | Pieper et al. ............... 379/93.17 |
| 2009/0061927 | A1 | 3/2009 | Lam et al. |
| 2010/0274847 | A1 | 10/2010 | Anderson et al. |
| 2011/0009096 | A1 | 1/2011 | Rotsztein et al. |
| 2014/0254437 | A1 | 9/2014 | Koch et al. |

* cited by examiner

*Primary Examiner* — Duc Nguyen
*Assistant Examiner* — Assad Mohammed
(74) *Attorney, Agent, or Firm* — Greenblum & Bernstein, P.L.C.

(57) ABSTRACT

An interactive voice response system receives an initial communication initiated by a remote requesting party and addressed to a numbered communications address. Based upon receipt at the interactive voice response system of the initial communication, visual data to provide to the remote requesting party as part of an integrated interactive script is determined. The visual data is provided to the remote requesting party as part of the integrated interactive script. Depending upon a preference of the remote requesting party, individual elements of the interactive script are sent to the remote requesting party iteratively based upon interaction between the remote requesting party and the interactive voice response system, or multiple individual elements of the interactive script are sent together to the remote requesting party, and individually presented to the remote requesting party based upon interaction between the remote requesting party and the interactive voice response system.

20 Claims, 7 Drawing Sheets

VISUAL INTERACTIVE VOICE RESPONSE

CROSS-REFERENCE TO RELATED APPLICATIONS

This is a continuation of pending U.S. patent application Ser. No. 12/961,620, filed on Dec. 7, 2010, the contents of which are expressly incorporated herein by reference in their entirety.

BACKGROUND

1. Field of the Disclosure

The present disclosure relates to the field of interactive voice response (IVR) services. More particularly, the present disclosure relates to complementing interactive voice response services with visual data.

2. Background Information

Interactive voice response systems provide callers with requested services. Callers dial a telephone number to reach the interactive voice response services, and the callers are connected to an interactive voice response platform that plays pre-recorded voice menus to the callers. The callers obtain the services by navigating through the pre-recorded voice menus.

DETAILED DESCRIPTION OF EMBODIMENTS

In view of the foregoing, the present disclosure, through one or more of its various aspects, embodiments and/or specific features or sub-components, is thus intended to bring out one or more of the advantages as specifically noted below.

Figure 1:
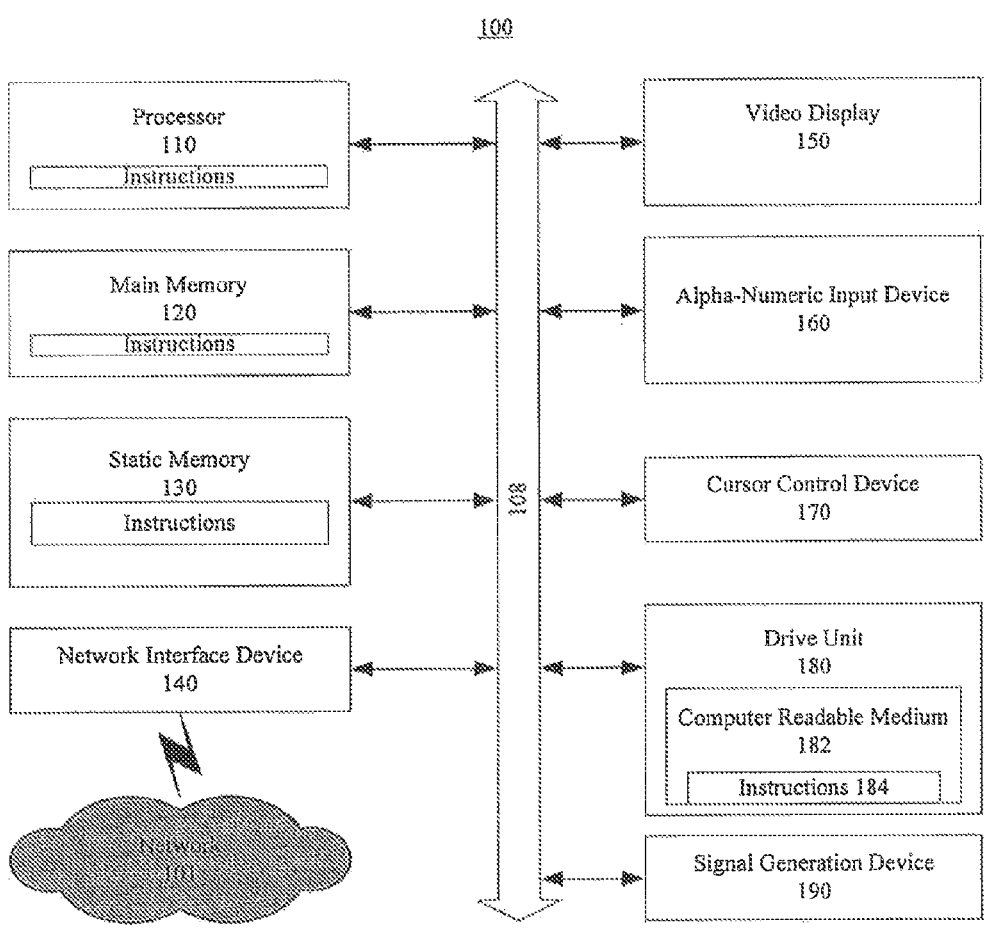
FIG. 1 shows an exemplary general computer system that includes a set of instructions for visual interactive voice response described herein.

FIG. 1 is an illustrative embodiment of a general computer system that includes a set of instructions for performing visual interactive voice response processes as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a cell phone, an intelligent peripheral computer, a service node intelligent peripheral computer, a media server, an interactive voice response unit computer, a personal computer (PC), a tablet PC, a personal digital assistant (PDA), a palmtop computer, a laptop computer, a desktop computer, or any other machine capable of executing a set of instructions (sequential or otherwise) that specify actions to be taken by that machine. In a particular embodiment, the computer system 100 can be implemented using electronic devices that provide voice, video and/or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

According to the present disclosure, interactive voice response scripts are enhanced and complemented by integrating visual data into the scripts. The visual data is provided to callers as part of the integrated interactive script. The visual data may be text data, image data or video data. The visual data may visually present an interactive voice response menu at the same time the voice menu is audibly presented to the caller. The visual data may also visually present other types of interactive voice response information at the same time the same or similar information is audibly presented to the caller. Alternatively, a visual presentation of menu options or information may replace an audible presentation of menu options or information as part of the interactive voice response scripts.

Figure 2:
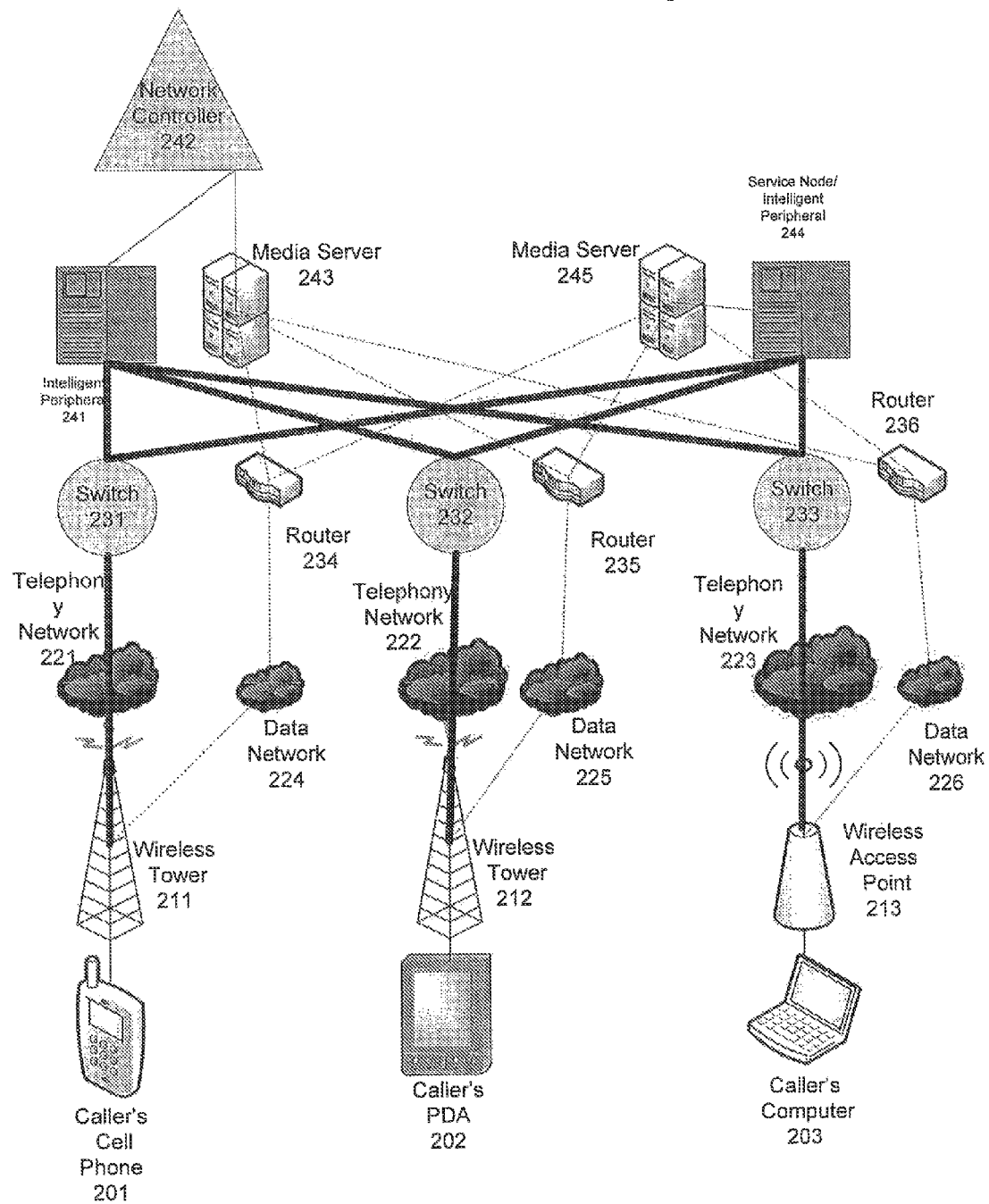
FIG. 2 shows an exemplary visual interactive voice response network, according to an aspect of the present disclosure.

FIG. 2 shows an exemplary visual interactive voice response network, according to an aspect of the present disclosure. In FIG. 2, user devices include a caller's cell phone 201, a caller's personal digital assistant 202, and a caller's computer 203. In the embodiment of FIG. 2, each of the user devices 201, 202 and 203 is capable of processing, sending and receiving audio and visual information over voice and data networks. In FIG. 2, telephony communications routes between elements are shown as solid lines and data communication routes between elements are shown as broken lines. Each of the user devices 201, 202 and 203 in FIG. 2 is capable of initiating communications to numbered communications addresses, such as by placing a call to a telephone number. Visual interactive voice response services described herein are obtained by a user initially calling such a numbered communications address to reach an interactive voice response platform in a telephone communications system.

The caller's cell phone 201 communicates with a switch 231 through a wireless tower 211 and telephony network 221. The telephony network 221 can be one or a combination of mobile networks such as a global system for mobile communications (GSM) network or code division multiple access (CDMA) network, or a landline network such as the public switched telephone network (PSTN). The telephony network 221 may also carry voice over internet protocol (VoIP) communications. The switch 231 routes calls from the caller's cell phone 201 to an intelligent peripheral 241. The intelligent peripheral 241 is controlled at least in part by a network controller 242, and the network controller 242 also controls at least in part a media server 243.

The intelligent peripheral 241, network controller 242 and media server 243 are elements of an interactive voice response system in the embodiment of FIG. 2. The network controller 242 directs the intelligent peripheral 241 and media server 243 to provide interactive voice response services according to a script. The intelligent peripheral 241 receives and translates voice or dual-tone multi-frequency (DTMF) tones from the caller's cell phone 201, and provides the translations as data to the network controller 242. The network controller 242 processes the translations in accordance with the script, and instructs the intelligent peripheral 241 to play specified pre-recorded text such as a set of menu options or other information to the caller. In accordance with the script, the network controller 242 also instructs the media server 243 to forward visual data to the caller's cell phone 201 via a router 234 and data network 224. The visual data may include text, images or videos. The visual data may also include internet pages provided to the user's device from an embedded internet address. The visual data provided through the router 234 and data network 224 is transmitted to the caller's cell phone 201 via the wireless tower 211. In an example where the visual data is interactive script, the entirety of an interactive script may be sent to the user's device at the beginning of a call, or individual items of the interactive script may be sent to the user's device iteratively depending on the user's selections of options in the interactive script.

The caller's personal digital assistant 202 communicates with a switch 232 through a wireless tower 212 and telephony network 222. The telephony network 222 can be one or a combination of mobile networks, or a landline network. The telephony network 222 may also carry voice over internet protocol communications. The switch 232 routes calls from the caller's personal digital assistant 202 to the intelligent peripheral 241. As noted already, the intelligent peripheral 241 is controlled at least in part by the network controller 242, and the network controller 242 also controls at least in part the media server 243.

The intelligent peripheral 241 receives and translates voice or dual-tone multi-frequency (DTMF) tones from the caller's personal digital assistant 202, and provides the translations as data to the network controller 242. The network controller 242 processes the translations in accordance with the script, and instructs the intelligent peripheral 241 to play specified pre-recorded text such as a set of menu options or other information to the caller. In accordance with the script, the network controller 242 also instructs the media server 243 to forward visual data to the caller's personal digital assistant 202 via a router 235 and data network 225. The visual data provided through the router 234 and data network 224 is transmitted to the caller's personal digital assistant 202 via the wireless tower 212.

The caller's computer 203 has a microphone and speaker, and communicates with a switch 233 through a wireless access point 213 and telephony network 223. The telephony network 223 can be one or a combination of mobile networks, or a landline network. The telephony network 223 may also carry voice over internet protocol communications. The switch 233 routes calls from the caller's computer 203 to the service node/intelligent peripheral 244. A service node/intelligent peripheral 244 in FIG. 2 is self directed, and not controlled by a network controller 242 at least for the purposes of visual interactive voice response processes described herein. Similarly, the media server 245 is also self directed in FIG. 2, and not controlled by a network controller 242 at least for the purposes of visual interactive voice response processes described herein.

The service node/intelligent peripheral 244 receives and translates voice or dual-tone multi-frequency (DTMF) tones from the caller's computer 203, and processes the translations in accordance with the script. The service node/intelligent peripheral 244 determines what pre-recorded text to provide to the caller's computer 203, and determines also when to instruct the media server 245 to send visual data to the caller's computer 203 in accordance with the script. The visual data provided through the router 236 and data network 226 is transmitted to the caller's computer 203 via the wireless access point 213.

For the sake of brevity, overlapping descriptions of interactions between elements of FIG. 2 are not provided in detail. However, in the embodiment of FIG. 2, any of the switches 231, 232 and 233 can route calls to either of the intelligent peripheral 241 or the service node intelligent peripheral 244 as shown. Similarly, in the embodiment of FIG. 2, any of the routers 234, 245 and 236 can communicate with either of the media server 243 or the media server 245 as shown. The user devices 201, 202, 203 and network elements 211-213, 231-236 and 241-245 are merely examples of the various user devices and network elements that can be used to provide voice and visual data communications consistent with the present disclosure.

Figure 6:
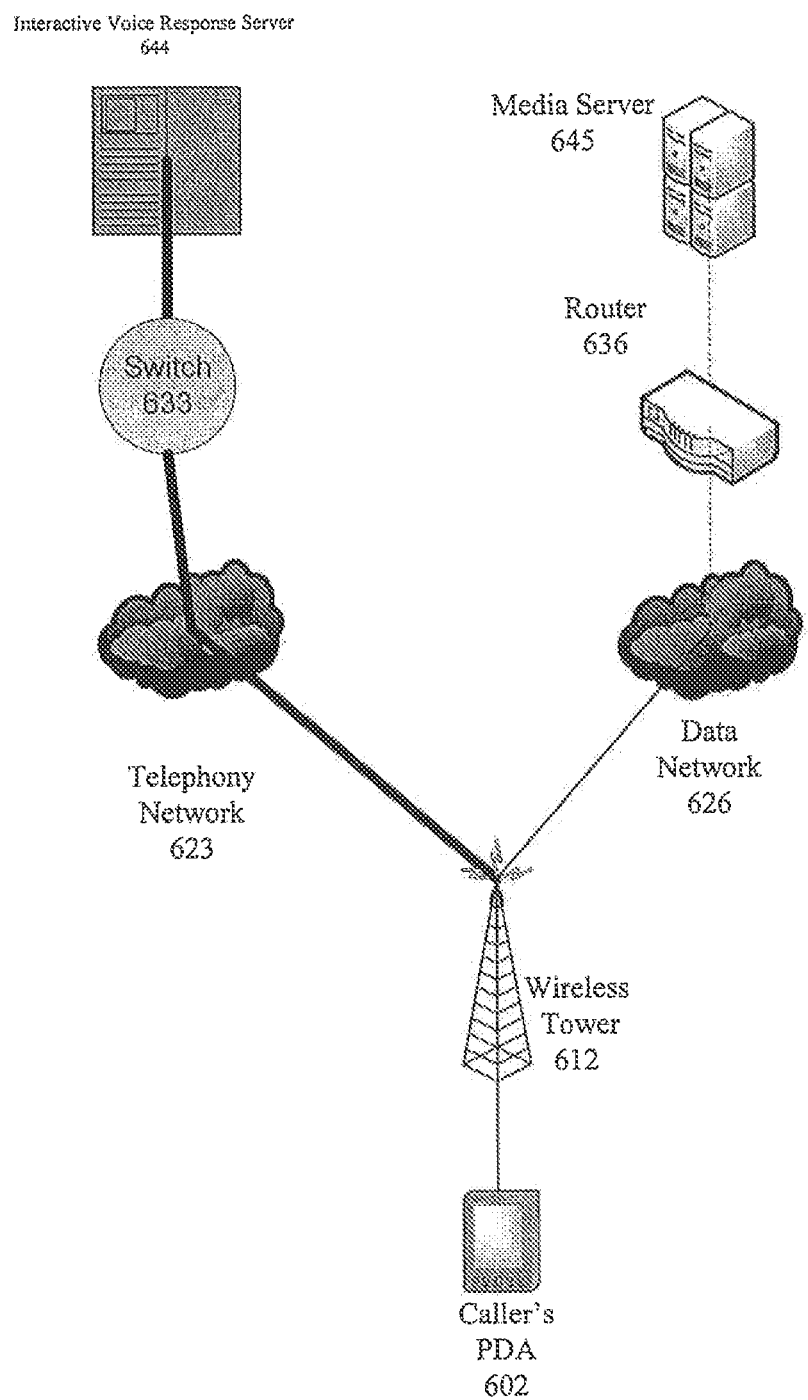
FIG. 6 shows another exemplary visual interactive voice response network, according to an aspect of the present disclosure.

FIG. 6 shows another exemplary visual interactive voice response network, according to an aspect of the present disclosure. In FIG. 6, an application on the user device 602 (caller's personal digital assistant) coordinates the visual interactive voice response service. In this embodiment, the interactive voice response server 644 and media server 645 need not interact with each other. Rather, the application on the caller's personal digital assistant 602 is used to call the interactive voice response server 644 through the telephony network 623 and switch 633, and the application on the caller's personal digital assistant 602 also monitors the user's input to determine when to obtain visual information from the media server 645 through the data network 626 and router 636. In this embodiment, communications with both the interactive voice response server 644 and media server 645 are provided via the wireless tower 612.

In the embodiment of FIG. 6, an application on caller's personal digital assistant 602 monitors the interaction between the user using the caller's personal digital assistant 602 and the interactive voice response server 644. In the embodiment of FIG. 6, the interactive voice response server 644 need not be aware of the monitoring, or of the application on the caller's personal digital assistant 602, or even that visual information will be requested by the application from the media server 645 based on the monitored interaction. Therefore, an application installed on the caller's personal digital assistant 602 or another user device consistent with those described herein may be provided by a party independent of both the interactive voice response server 644 and media server 645. Such an application may be sold to customers, or provided on a per-use basis or on a subscription basis.

Figure 7:
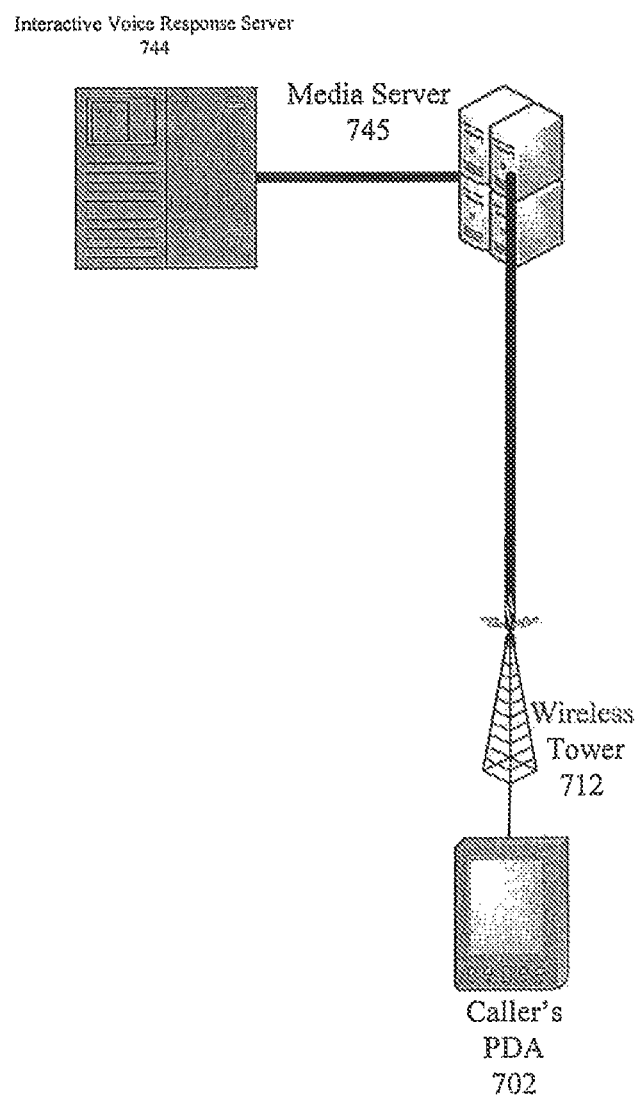
FIG. 7 shows another exemplary visual interactive voice response network according to an aspect of the present disclosure.

FIG. 7 shows another exemplary visual interactive voice response network according to an aspect of the present disclosure. In the embodiment of FIG. 7, a user device 702 (caller's personal digital assistant) calls the media server 745 through the wireless tower 712. In the embodiment of FIG. 7, the caller's personal digital assistant 702 establishes only a single communication session, whether synchronized or asynchronized, with a server. In this embodiment, the media server 745 intermediates the voice portion of an interactive voice response session between the caller's personal digital assistant 702 and the interactive voice response server 744. The media server 745 monitors the voice portion of the interactive voice response session, and determines when to send visual information to the caller's personal digital assistant 702.

In the embodiment of FIG. 7, the interactive voice response server 744 need not be aware of the monitoring or intermediation by the media server 745, or even that visual information will be provided by the media server 745 to a user based on the monitoring or intermediation. Therefore, a media server 745 may be provided by a party independent of both the interactive voice response server 744 and any "new" specialized application installed on a callers' personal digital assistant 702.

In the example of FIG. 7, a media server 745 may be aware of the scripts installed on interactive voice response server 744. The media server 745 can then provide a modified, enhanced visual interactive voice response session with callers for an end provider of the interactive voice response server 744, even without the awareness of the interactive voice response server 744. In this example, the media server 745 may receive the initial call from the caller's personal digital assistant 702 and then establish a second call to the interactive voice response server 744 to pass along input from the user. Alternatively, the media server 745 may pass the call from the caller's personal digital assistant 702 through to the interactive voice response server 744, and then monitor the interaction and user input to determine when to send visual information to the caller.

In modifications of embodiments described herein, the source of visual information does not necessarily have to come from a media server such as 645 or 745. For example, the source of visual information may be provided in a peer-to-peer network, where a peer computer replaces the media server 745 in FIG. 7 to monitor or intermediate a call between a user device and an interactive voice response server, and to directly or otherwise provide visual information to supplement the interactive voice response session.

As described above, services provided by existing interactive voice response systems can be enhanced with visual interactive voice response without modifying the interactive voice response systems. Visual interactive voice response can be provided by third-party providers other than existing interactive voice response providers. Visual interactive voice response can also be provided by peers in a peer-to-peer network, even by coordination provided by a single application installed on a user device. Similarly, as described elsewhere herein, an existing interactive voice response system can be modified to call for visual information at specified points in the script.

Figure 3:
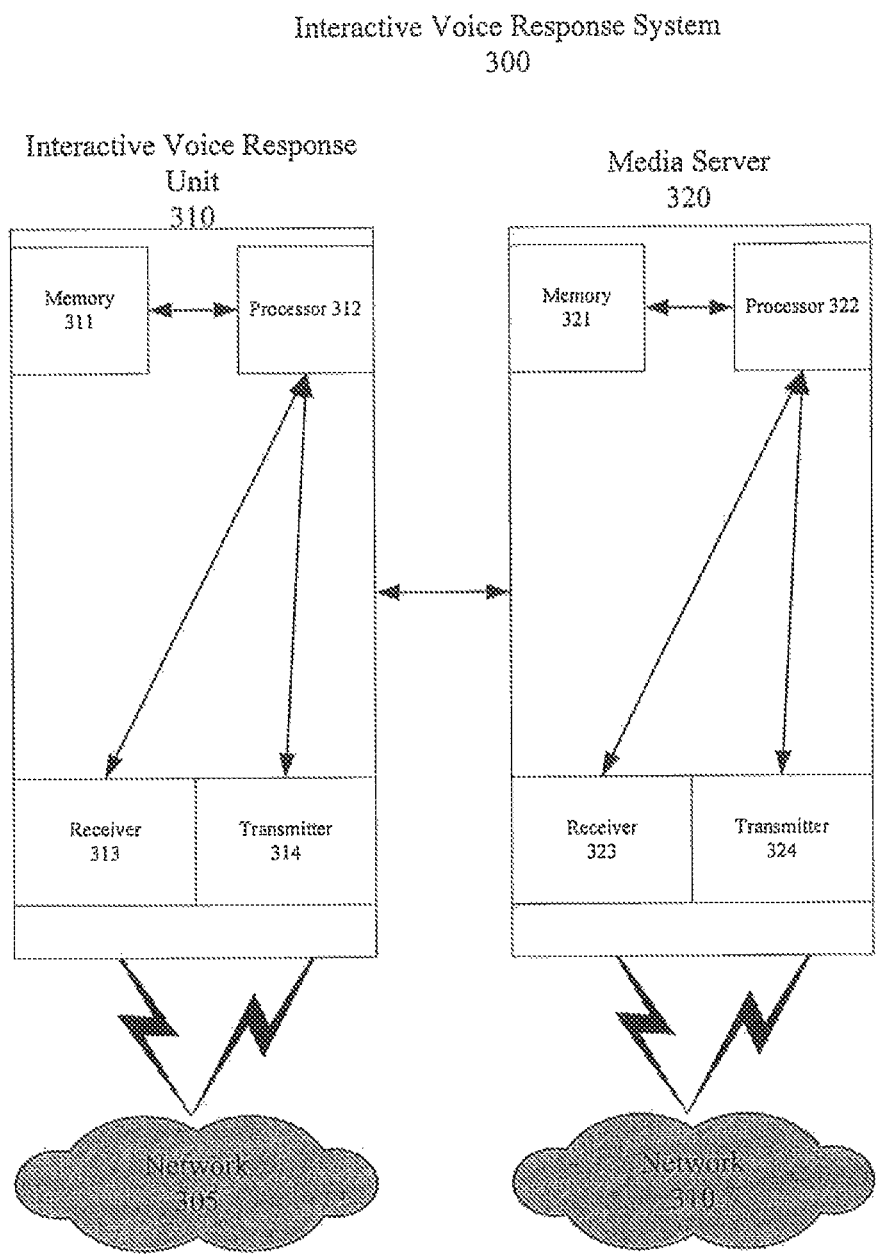
FIG. 3 shows an exemplary visual interactive voice response system, according to an aspect of the present disclosure.

FIG. 3 shows an exemplary visual interactive voice response system, according to an aspect of the present disclosure. As shown, the exemplary visual interactive voice response system 300) includes an interactive voice response unit 310 and a media server 320. The interactive voice response unit 310 may be, for example, a server computer that interfaces with a telephony network to receive calls and interact with callers. Alternatively, the interactive voice response unit 310 may be an endpoint customer premise equipment computer that interfaces with a telephony network to receive calls and provide services at one or more telephone numbers such as 1-800 numbers.

The interactive voice response unit 310 includes a memory 311, processor 312, receiver 313 and transmitter 314. The interactive voice response unit 310 communicates over a network 305. The memory 311 may store algorithmic interactive scripts and recorded voice menus and other information. The memory 311 also may store a program for translating and processing input received from callers calling a service provided in whole or in part by the interactive voice response unit 310. The processor 312 processes instructions and data to translate input from callers and to determine which voice menu options and information to provide to caller.

The media server 320 includes a memory 321, a processor 322, a receiver 323 and a transmitter 324. The media server 320 communicates over network 310. The memory 321 may store instructions for processing by the processor 322, as well as digital visual data to provide to users upon instructions from the interactive voice response unit 310. The interactive voice response unit 310 instructs the media server 320 to send users specific digital visual data as part of a script processed by the processor 312 of the interactive voice response unit 312. In an embodiment, the media server 320 may participate in determining which visual data to send to a user, such as when instructions provided by the interactive voice response unit 310 identify groups of pieces of visual data to send rather than only a single piece of visual data. The processor 322 then contains instructions to help identify one or more pieces of visual data to send in response to a request/instruction from the interactive voice response unit 310.

Figure 4:
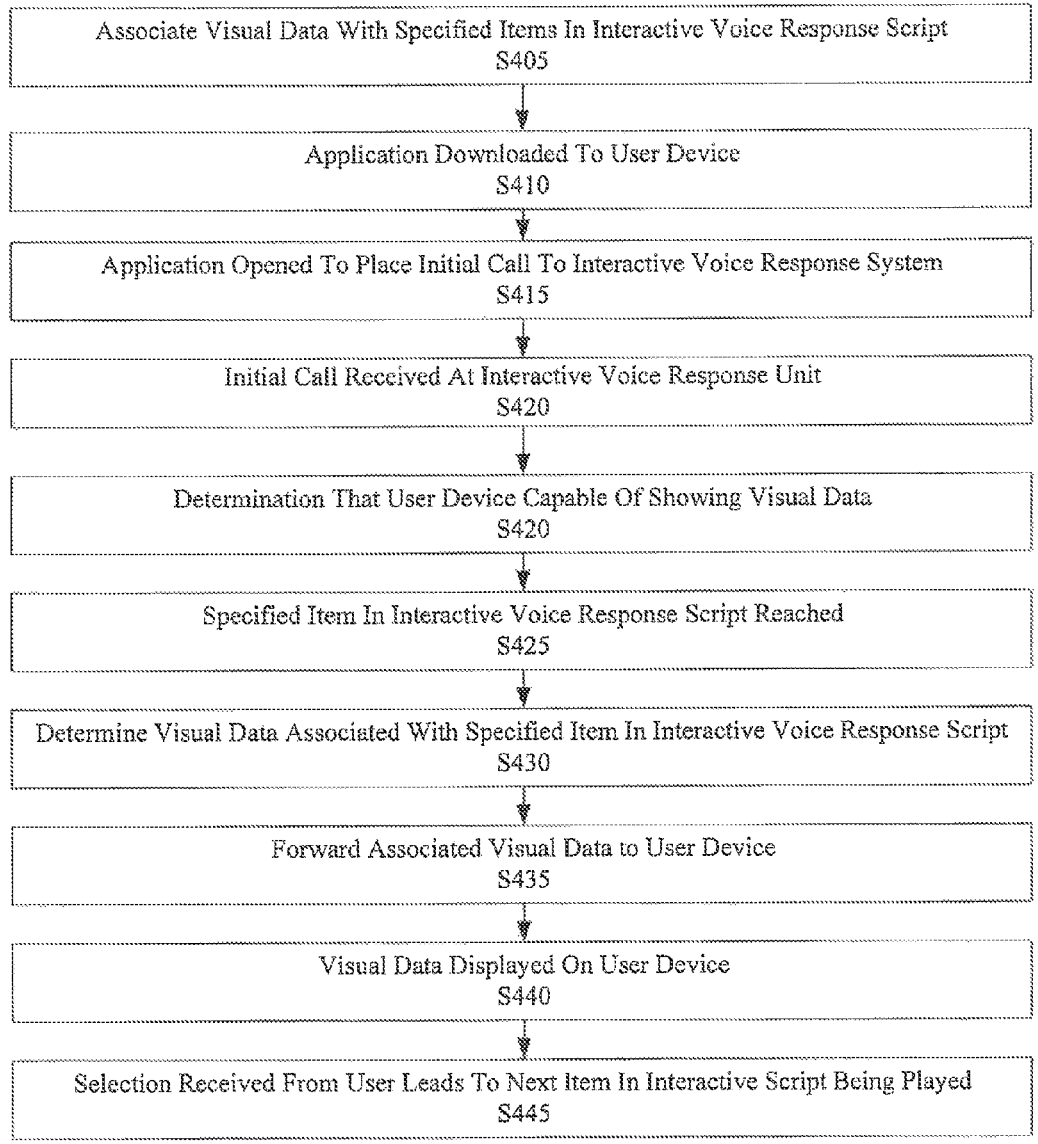
FIG. 4 shows an exemplary visual interactive voice response process, according to an aspect of the present disclosure.

FIG. 4 shows an exemplary visual interactive voice response process, according to an aspect of the present disclosure. The embodiment of FIG. 4 includes acts performed by different parties in practicing visual interactive voice response. At S405, visual data managed by a media server 320 is associated with specified items in an interactive voice response script performed by an interactive voice response unit 310. At S410, a client application for visual interactive voice response is downloaded to a user device. The client application may be pre-installed on a user device before the user device is provided to a user, or may be downloaded and installed upon request.

As an example, a user calling an interactive voice response unit 310 may receive a text message from media server 320 offering to forward an application to the user device used by the user. If the user accepts by pressing a specified button on the user device, the interactive voice response unit 310 receives and processes the acceptance, and conveys an instruction to media server 320 to forward the application to the user device. Thereafter, the user can initiate the application to call specified visual interactive voice response services.

Visual interactive voice response services can be provided with or without installing a new application on a user device. An application may be initially provided with phone numbers for one or more interactive voice response services. Phone numbers for such services may also be discovered or otherwise obtained by an application on a user device after the application is installed.

Alternatively, visual interactive voice response services can be provided to a user device when the user calls a telephone number. For example, when a user buys a new television, a telephone number could be printed on the cover of the instruction manual for the television. When the user calls the printed telephone number, an interactive digital user manual can be provided as a visual interactive voice response service. Such a flexible interactive voice response service could be provided with an existing visual interactive voice response application installed on the user device, or with a visual interactive voice response application installed at the time the user calls the printed number. For example, when a user purchases a piece of electronic equipment, the user may be instructed to download a visual interactive voice response service application to a cell phone or personal digital assistant from a website, and then contact a service at a particular number if help is needed to install the electronic equipment. In this manner, a user can call a particular number and navigate through a menu in order to obtain text, image or video information to illustrate how to resolve a problem.

In another example, a user may download an application to a cell phone or personal digital assistant before traveling. A user can then identify and call an interactive voice response service and obtain maps or text directions when needed upon navigating to a particular point in a an interactive voice response script.

At S415, the application is opened to place an initial call to an interactive voice response system using the interactive voice response application. At S420, the initial call is received at the interactive voice response unit S310. At S420, the interactive voice response unit 310 determines that the client device is capable of showing visual data. The application downloaded at S410 may immediately and automatically notify the interactive voice response unit S310 that the client device is capable of showing visual data. The application may also notify the interactive voice response unit S310 of which types of visual data can be displayed on the user device. In any event, at S420 the interactive voice response unit 310 determines at least the existence of visual display capabilities of the user device, such as by recognizing that the user is calling using the application downloaded at S410. As another example, the interactive voice response unit 310 may determine the display capabilities by obtaining an address or device identification of the user device, and determining from the address or device identification that the user device has capability of showing visual data. The interactive voice response unit 310 may also send or arrange for the media server 320 to send a data inquiry to the user device, simply requesting the user device to advise of any capabilities for displaying visual information. Finally, the interactive voice response unit 310 may play a prompt for the user to indicate whether the user's device is capable of displaying visual information.

At S425, during processing of the interactive voice response script by the interactive voice response unit 310, a specified item in the script is reached where the interactive voice response unit 310 instructs the media server 320 to send visual data to the user device. At S430, the media server 320 determines which visual data is associated with the specified item in the script. At S435, the associated visual data is forwarded to the user device from the media server 320. At S440, the visual data is displayed on the user device, either automatically upon receipt, or upon acknowledgement and authorization of the user. At S445, the user in prompted by the interactive voice response unit 310 or by the visual data itself to input a selection. The user selection is processed by the interactive voice response unit 310 and leads to the next item in the interactive voice response script being played by the interactive voice response unit 310.

Figure 5:
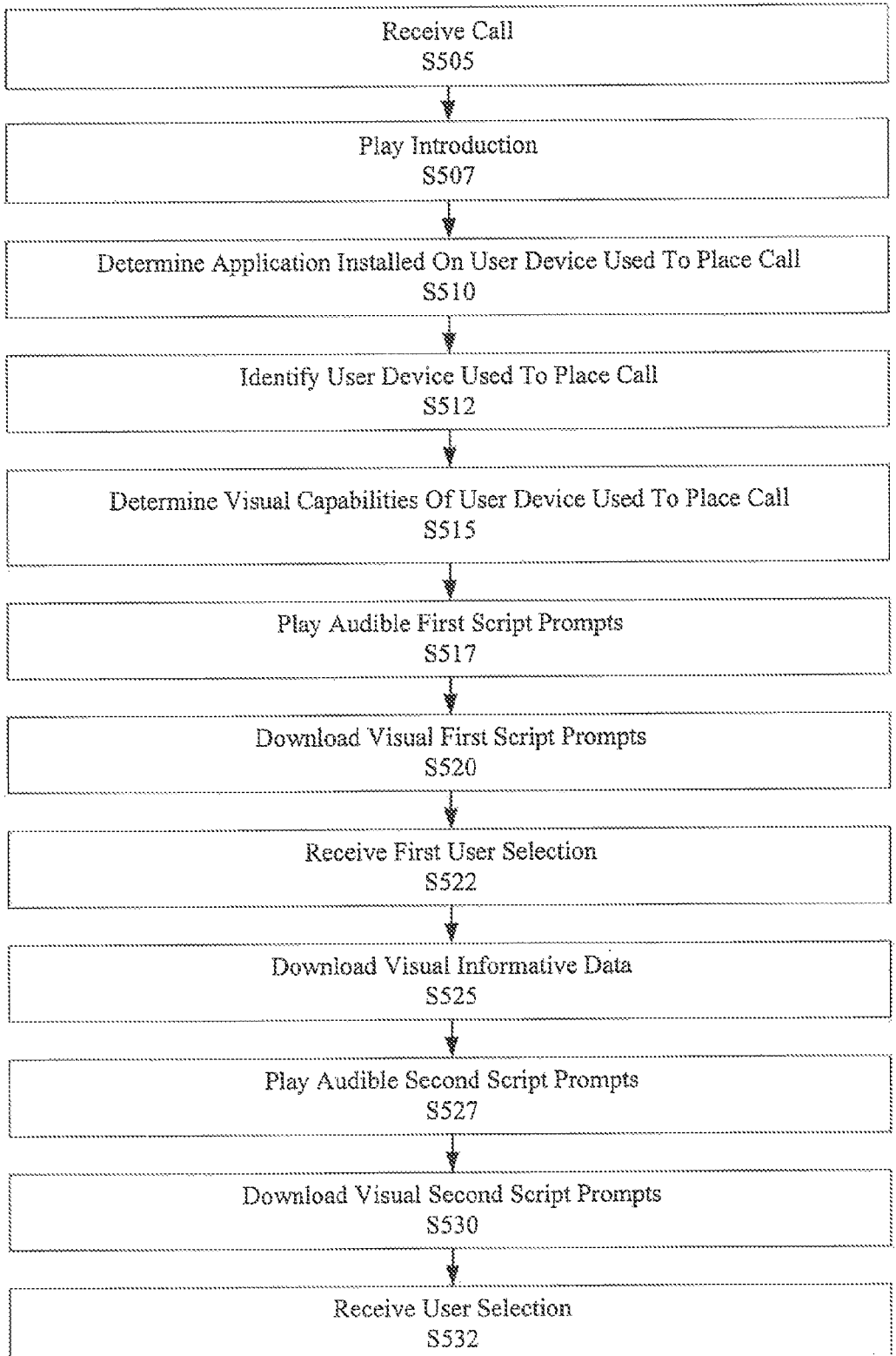
FIG. 5 shows another exemplary visual interactive voice response process, according to an aspect of the present disclosure.

FIG. 5 shows another exemplary visual interactive voice response process, according to an aspect of the present disclosure. FIG. 5 is a process from the viewpoint of an interactive voice response system including interactive voice response unit 310 and media server 320. In FIG. 5, a call is received by the interactive voice response unit 310 at S505. The interactive voice response unit 310 plays an introduction to the caller at S507. At S510, the interactive voice response unit S510 determines that a visual interactive voice response application is installed on the user device used to place the call. At S512, the user device used to place the call is identified, either by a communications address of the user device or by a device identification of the user device. At S515, visual capabilities of the user device used to place the call are determined.

The determination at S515 may be so that the interactive voice response system can determine which among several different types of visual data should be sent to the caller at specified points in the interactive voice response script. For example, the interactive voice response script may decide to send information to a user device, and may have options of sending a text message, an image of the words in the text message, or a video of a character stating the words of the text message.

At S517, audible first script prompts are played to the user by the interactive voice response unit 310. At S520, the same first script prompts are downloaded to the user device from the media server 320 and displayed. By these acts, the user may have the option of listening to or viewing options played by the interactive voice response unit 310. At S522, the interactive voice response unit 310 receives user selections, and at S525, visual informative data is downloaded to the user device from the media server 320 and displayed. The visual informative data downloaded and displayed at S525 is provided in response to the user selections at S522.

For example, at S517 and S520, the user may be prompted to select one of several possible problems, and at S522 the user identifies and selects the problem for which the user is calling. At S525, the user is then presented with text, image or video information that attempts to address the problem identified and selected by the user.

At S527, audible second script prompts are played to the user by the interactive voice response unit 310. At S530, visual second script prompts are downloaded to the user device from the media server 320, and at S532 another user selection is received by the interactive voice response unit 310.

Although an interactive voice response unit 310 is described as the source and recipient of voice interaction in FIG. 3, other networked computing apparatuses capable of providing, receiving and processing voice interactions may serve in the role of source and recipient of voice interaction for visual interactive voice response. Similarly, though a media server 320 is described as the source of visual data in FIG. 3, other computing apparatuses capable of providing text, image and video data may serve in the role of source for visual data for visual interactive voice response.

Though the interactive voice response unit 310 and media server 320 are shown as separate elements in FIG. 3, the processes performed by each of these separate networked elements may be provided by a single, integrated computer in an embodiment. Similarly, though the interactive voice response unit 310 and media server 320 are shown as closely-related elements of an interactive voice response system 300 in FIG. 3, sources of visual data may Visual data described so far in the disclosure generally includes text, image and video. However, other types of electronic visual data may also be provided as the visual data for visual interactive voice response. Other types of electronic visual data that may be provided include webpages, documents, and electronic maps, although any type of electronic visual data is contemplated within the scope of this disclosure.

Uses of visual interactive voice response include most any service provided by interactive voice response units and systems. For example, visual interactive voice response can be used to send the sets of menu options, or even entire scripts including all possible menu options, as text or interactive text for display, even while the menu options or scripts are audibly played to callers. Such interactive text may be provided in hyper-text markup language (HTML) or as JavaServer Pages (JSP). A user calling a number to determine store hours and holiday schedules can obtain the entire schedule for a store, including hours and holidays, as a text message upon navigating to a particular point of an interactive voice response script. A user can then call a visual interactive voice response system and determine whether the user has enough time to travel to a store before the store closes on a particular day. The visual data may also include interactive selectable data corresponding to menu options provided as part of a script for a visual interactive voice response service. For example, a user may receive a display of multiple selectable options to reach different departments or obtain different types of information from a business that provides a visual interactive voice response service.

As an exemplary set of selectable options, a first option may be an option to reach administrative staff, a second option may be an option to obtain information about directions, holidays, or warehouse hours, a third option may be an option to obtain information about memberships or returns, a fourth option may be an option to reach a pharmacy, and a fifth option may be an option to reach all other departments. The five options may be displayed on a single visual display on a user device at the same time the options are played as pre-recorded voices on the user device. Further, selection of an option may be made either audibly or by selecting an option on the visual display, where registration of the audible selection is received by the interactive voice response unit 310 and registration of the visual selection is received by the media server 320 in an embodiment.

As a result of using visual interactive voice response, a user may be able to navigate interactive voice response scripts and menus before the interactive voice response unit 310 finishes audibly playing the scripts and menus to the caller. That is, the visual display of a set of options may be displayed and reviewed by the caller before the set of options is audibly played to the caller. In this manner, a user calling an interactive voice response service at a specified number may obtain the services using either voice and dual-tone multi-frequency selections or, when provided, by selecting options from a visual display. Users can therefore navigate through a single script by making voice and dual-tone multi-frequency selections at some parts of the script, and by selecting options from a visual display at other parts of the script. If different computers are used to provide the audible and visual information that each independently and simultaneously offer the same selections, the different computers coordinate selections to ensure that selections are properly registered and do not conflict.

According to an aspect of the present disclosure, a method of providing information includes determining, based upon receipt at an interactive voice response system of an initial communication initiated by a remote requesting party and addressed to a numbered communications address, visual data to provide to the remote requesting party as part of an integrated interactive script. The method also includes providing the visual data to the remote requesting party as part of the integrated interactive script.

According to another aspect of the present disclosure, the initial communication is initiated by the remote requesting party using an application downloaded to a personal communications device used by the remote requesting party. According to this aspect, the application notifies the interactive voice response system that the personal communications device has the capability of displaying the visual data.

According to still another aspect of the present disclosure, the numbered communications address is a telephone number, and the initial communication is initiated by the remote requesting party addressing the telephone call to the telephone number.

According to still another aspect of the present disclosure, the initial communication is a call received at an interactive voice response unit of the interactive voice response system.

According to another aspect of the present disclosure, the method includes receiving, at a media server, notification from the interactive voice response unit of receipt of the call and identification of the visual data to send to the remote requesting party. According to this aspect, the visual data is provided to the remote requesting party by forwarding the visual data from the media data in response to receipt of the call at the interactive voice response unit.

According to still another aspect of the present disclosure, the visual data is sent to the remote requesting party from a media server of the interactive voice response system.

According to yet another aspect of the present disclosure, the initial communication is a call received at an interactive voice response unit of the interactive voice response system, and the visual data is sent to the remote requesting party from a media server of the interactive voice response system.

According to another aspect of the present disclosure, the method also includes determining that a personal communications device used by the remote requesting party to send the initial communication has a capability of displaying the visual data.

According to still another aspect of the present disclosure, the visual data is text data.

According to yet another aspect of the present disclosure, the visual data is image data.

According to another aspect of the present disclosure, the visual data is video data.

According to still another aspect of the present disclosure, the video data is at a selectable embedded link to an internet address.

According to yet another aspect of the present disclosure, the method also includes providing to the remote requesting party audible information corresponding to the visual data simultaneous to the providing the visual data to the remote requesting party.

According to another aspect of the present disclosure, the visual data is an interactive script.

According to still another aspect of the present disclosure, individual elements of the interactive script are sent to the remote requesting party iteratively based upon interaction between the remote requesting party and the interactive voice response system.

According to yet another aspect of the present disclosure, multiple individual elements of the interactive script are sent together to the remote requesting party, and individually presented to the remote requesting party based upon interaction between the remote requesting party and the interactive voice response system.

According to another aspect of the present disclosure, the method also includes receiving audible input from the remote requesting party responsive to a selection by the remote requesting party of one of a plurality of choices in the visual data.

According to an aspect of the present disclosure, at least one non-transitory computer readable medium stores an executable program for providing information. The executable program, when executed by at least one processor, performs acts including determining, based upon receipt at an interactive voice response system of an initial communication initiated by a remote requesting party and addressed to a numbered communications address, visual data to provide to the remote requesting party as part of an integrated interactive script. The executable program, when executed by at least one processor, also performs acts including providing the visual data to the remote requesting party during the initial communication as part of the integrated interactive script.

According to another aspect of the present disclosure, the visual data is determined based upon input from the remote requesting party subsequent to receipt of the initial communication at the interactive voice response system.

According to an aspect of the present disclosure, a tangible, non-transitory media server in an interactive voice response system for providing information includes a tangible memory and a processor. The processor determines, based upon receipt at the interactive voice response system of an initial communication initiated by a remote requesting party and addressed to a numbered communications address, visual data to provide to the remote requesting party as part of an integrated interactive script. The media server also includes a transmitter that provides the visual data to the remote requesting party during the initial communication as part of the integrated interactive script.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored. The various methods and processes described herein may be performed by one or more processors of computing devices that execute instructions of computer programs stored in memories of devices and apparatuses as described herein.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing information, comprising:
   determining, by a processor of an interactive voice response system, based upon receipt at the interactive voice response system of an initial communication initiated by a remote requesting party and addressed to a numbered communications address, visual data to provide to the remote requesting party as part of an integrated interactive script; and
   providing the visual data to the remote requesting party as part of the integrated interactive script,
   wherein depending upon a preference of the remote requesting party, individual elements of the interactive script are sent to the remote requesting party iteratively based upon interaction between the remote requesting party and the interactive voice response system, or multiple individual elements of the interactive script are sent together to the remote requesting party, and individually presented to the remote requesting party based upon interaction between the remote requesting party and the interactive voice response system.

2. The method of providing information of claim 1, further comprising:
   receiving device identification information of a communications device of the remote requesting party and using the device identification information to determine that the communications device has a capability of displaying visual data.

3. The method of providing information of claim 1, further comprising:
   receiving, at a media server, notification from an interactive voice response unit of the interactive voice response system of receipt of a call and identification of the visual data to be sent to the remote requesting party.

4. The method of providing information of claim 1, wherein the visual data is provided to the remote requesting party by forwarding the visual data from a media server in response to receipt of a call at an interactive voice response unit of the interactive voice response system.

5. The method of providing information of claim 1, wherein the visual data is sent to the remote requesting party from a media server of the interactive voice response system.

6. The method of providing information of claim 1, wherein the initial communication is a call received at an interactive voice response unit of the interactive voice response system, and
   wherein the visual data is sent to the remote requesting party from a media server of the interactive voice response system.

7. The method of providing information of claim 1, wherein the visual data comprises text data.

8. The method of providing information of claim 1, wherein the visual data comprises image data.

9. The method of providing information of claim 1, wherein the visual data comprises video data.

10. The method of providing information of claim 9, wherein the video data is at a selectable embedded link to an internet address.

11. The method of providing information of claim 1, further comprising:
    providing to the remote requesting party audio information corresponding to the visual data simultaneously to the providing the visual data to the remote requesting party.

12. The method of providing information of claim 1, wherein the visual data comprises an interactive script.

13. The method of providing information of claim 1, further comprising:
    receiving input from the remote requesting party responsive to a selection by the remote requesting party of one of a plurality of choices in the visual data.

14. The method of providing information of claim 1, further comprising:
    determining from address information of a communications device of the remote requesting party whether the communications device has a capability of displaying visual data.

15. The method of providing information of claim 1, wherein the interactive voice response system determines that a communications device of the remote requesting party has a capability of displaying visual data.

16. A non-transitory computer readable storage medium encoded with an executable computer program for providing information and that, when executed by a processor of an interactive voice response system, causes the processor to perform operations comprising:
    determining, based upon receipt at the interactive voice response system of an initial communication initiated by a remote requesting party and addressed to a numbered communications address, visual data to provide to the remote requesting party as part of an integrated interactive script; and providing the visual data to the remote requesting party during the initial communication as part of the integrated interactive script, wherein depending upon a preference of the remote requesting party, individual elements of the interactive script are sent to the remote requesting party iteratively based upon interaction between the remote requesting party and the interactive voice response system, or multiple individual elements of the interactive script are sent together to the remote requesting party, and individually presented to the remote requesting party based upon interaction between the remote requesting party and the interactive voice response system.

17. The non-transitory computer readable storage medium of claim 16, wherein the visual data is sent to the remote requesting party from a media server of the interactive voice response system.

18. The non-transitory computer readable storage medium of claim 16, further comprising:

receiving device identification information of a communications device of the remote requesting party and using the device identification information to determine that the communications device has a capability of displaying visual data.

19. The non-transitory computer readable storage medium of claim 16, wherein the interactive voice response system determines that the communications device has a capability of displaying visual data.

20. A media server in an interactive voice response system for providing information, comprising:

a processor;

a memory storing instructions that, when executed by the processor, cause the processor to perform operations comprising determining, based upon receipt at the interactive voice response system of an initial communication initiated by a remote requesting party and addressed to a numbered communications address, visual data to provide to the remote requesting party as part of an integrated interactive script; and a transmitter that provides the visual data to the remote requesting party as part of the integrated interactive script, wherein depending upon a preference of the remote requesting party, individual elements of the interactive script are sent to the remote requesting party iteratively based upon interaction between the remote requesting party and the interactive voice response system, or multiple individual elements of the interactive script are sent together to the remote requesting party, and individually presented to the remote requesting party based upon interaction between the remote requesting party and the interactive voice response system.

* * * * *